Jan. 5, 1926.
W. GOFF
1,568,829
BATTERY INDICATOR
Filed Sept. 9, 1924
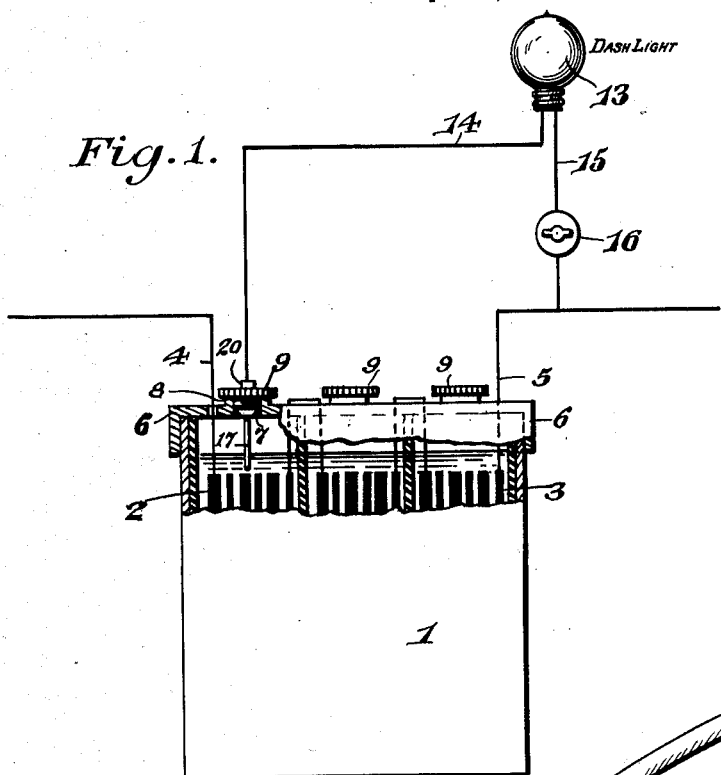
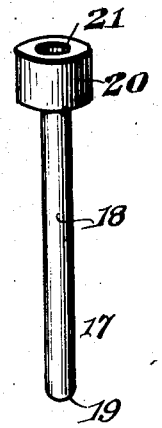
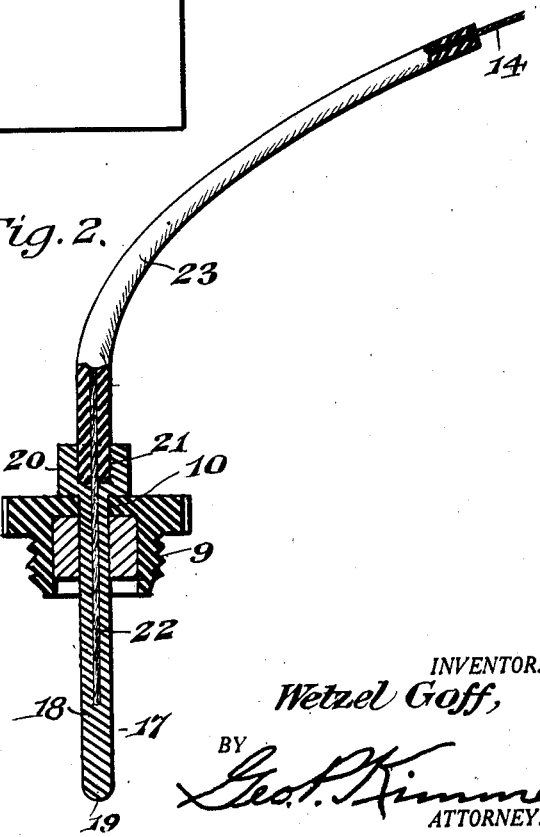
INVENTOR.
Wetzel Goff,
BY Geo. F. Kimmel
ATTORNEY.

Patented Jan. 5, 1926.

1,568,829

UNITED STATES PATENT OFFICE.

WETZEL GOFF, OF WESTON, WEST VIRGINIA.

BATTERY INDICATOR.

Application filed September 9, 1924. Serial No. 736,729.

*To all whom it may concern:*

Be it known that I, WETZEL GOFF, a citizen of the United States, residing at Weston, in the county of Lewis and State of West Virginia, have invented certain new and useful Improvements in Battery Indicators, of which the following is a specification.

This invention relates to a battery indicator, and has for its object to provide a device of such class, in a manner as hereinafter set forth, for visually indicating that a battery requires attention due to the evaporation or condition of charge or discharge of the electrolyte.

A further object of the invention is to provide, in a manner as hereinafter set forth, a battery indicator provided with means for its quick detachment from the battery when it is desired to refill the same.

A further object of the invention is to provide, in a manner as hereinafter set forth, a battery indicator including an electrode constructed to slidably extend through a filling opening closure cap or plug, as well as frictionally engaging with the latter, so that the electrode can be quickly removed from or inserted through the plug when occasion requires, and furthermore whereby the opening through which extends the electrode can be utilized for battery filling purposes under such conditions overcoming the necessity of removing the plug when it is desired to fill the battery.

A further object of the invention is to provide, in a manner as hereinafter set forth, a battery indicator including an electrode and a circuit connection therebetween and an indicator, such as the dashlight of a motor vehicle, and further to so construct the electrode to prevent the acid from the battery attacking that terminal portion of the circuit connection which is attached to the electrode, under such conditions reducing impairment to said connection to a minimum, as well as increasing the life of such connection.

A further object of the invention is to provide, in a manner as hereinafter set forth, a battery indicator including an electrode having connected therewith a circuit wire conductor, and utilizing the electrode as a protective medium for that terminal portion of the conductor which is attached to the electrode.

Further objects of the invention are to provide, in a manner as hereinafter set forth, a battery indicator for the purpose referred to, which is extremely simple in its construction and arrangement, readily installed with respect to the battery, compact, durable, strong, thoroughly efficient in its use, conveniently connected and disconnected from the battery when the occasion requires, and inexpensive to manufacture.

With the foregoing and other objects in view, the invention consists of a novel construction, combination and arrangement of parts, as hereinafter more specifically described and illustrated in the accompanying drawings, wherein is shown an embodiment of the invention, but it is to be understood that changes, variations and modifications can be resorted to which fall within the scope of the claims hereunto appended.

Figure 1, is a fragmentary view, in elevation, of a battery showing the adaptation therewith of a battery indicator in accordance with this invention.

Figure 2, is an elevation, partly in section, of the electrode and circuit conductor which leads therefrom to the indicating element.

Figure 3, is a perspective view of the electrode.

Referring to the drawings in detail, 1 denotes a battery, 2, 3, the electrodes thereof, 4 a circuit conductor connected to the electrode 2 and 5 a circuit conductor connected to the electrode 3.

The top or cover of the battery is indicated at 6 and which is formed with a filling opening 7. The upper face of the top or cover 6 is formed with an annular boss 8, which surrounds the opening 7. Threadedly engaging with the walls of the opening 7 is a flange closure plug 9 therefor of any suitable construction, and which is provided axially thereof with a vertically disposed bore 10, through the medium of which the battery can be supplied with an electrolyte 11 without the necessity of removing the plug 9. The boss 8 constitutes a seat for the flange for the plug 9. The foregoing elements, other than the providing of a plug 9, with the opening 10, are of known construction. The battery plates are indicated at 12.

The battery indicator in accordance with this invention includes an indicating element 13, which is the dashlight of the vehicle and leading from said element 13 is a pair of circuit conductors 14, 15. The conductor 15 is electrically connected with the conductor 5 and has interposed therein a switch 16. The conductor 14 is connected to an electrode 17. The electrode 17, when in operative position, extends through the cap 9 and into the electrolyte 11.

The electrode 17 comprises a cylindrical stem 18 of substantial length, is rounded at its inner end as at 19, and has an enlarged annular head 20 at its outer end. The head 20 is formed with a socket 21. The electrode 17 is constructed of lead and is adapted to have imbedded therein, for a portion of the length thereof the lower end terminal portion 22 of the circuit conductor 14. The conductor 14 is arranged in a casing of insulation, as indicated at 23 and said casing has its lower end terminating at a point removed from the lower end of the conductor 14. The lower end of the casing 23 is mounted in the socket 21, abuts against the bottom of the latter, as well as snugly engaging the wall of the socket. The conductor 14 projects from the casing 23, extends through the lower portion of the head 20 and into the stem 18. In this connection, see Figure 2. The head 20 acts as a protective medium for the point of connection thereof with the casing 23 and the stem 22 acts as a protective medium for that portion of the conductor 14 which projects from the lower end of the casing 23.

By connecting the conductor 14 and casing 23, to the electrode 17 in the manner as referred to, there is no possibility of the acid from the battery attacking the conductor 14 and impairing the same or to injure the joint between the conductor 14 and the electrode 17.

The stem 18, of the electrode 17, is of a diameter to snugly or frictionally engage with the wall of the opening 10, but the engagement is such as not to interfere in any manner with the quick removal and insertion of the electrode from and through the plug 9 when occasion requires, and by this arrangement the electrode can be quickly removed and the opening 10 utilized for filling purposes when desired.

If the vehicle is not provided with a dashlight, a lamp can be quickly connected to the conductors 14 and 15 to provide the indicating element of the indicator, and by this arrangement the vehicle then will be provided with a dashlight.

If the switch 16 is closed, and the battery is normal, the dashlight will indicate the same, but if the dashlight is not illuminated it will indicate that the battery requires attention.

It is thought that the many advantages of a battery indicator, in accordance with this invention can be readily understood, particularly in view of the quick connection thereof with the battery, and further the manner of protecting the connection between the conductor and the electrode, and although the preferred embodiment of the invention is as illustrated and described, yet it is to be understood that changes in the details of construction can be had, which will fall within the scope of the invention as claimed.

What I claim is:

1. In combination, a battery filling opening closure plug provided with an opening, an electrode consisting of a stem and an enlarged head provided with a socket opening at the top thereof, said stem slidably extending through and snugly engaging with the wall of said opening, said head abutting against the upper face of said plug and overlapping said opening, a circuit conductor having its lower terminal portion embedded in said head below said socket, said lower terminal portion further extending into and embedded in said stem to a point removed from the inner end of the latter, and a covering of insulation for that portion of said conductor projecting outwardly from the bottom of the socket, said covering extending into said socket and snugly fitting throughout the wall and bottom of the socket 2. In combination, a conductor adapted to lead to an indicating element, an electrode adapted to extend into a battery and consisting of a stem and a head, said head provided with a socket spaced from said stem, said conductor extending through said socket and into said stem and further embedded in the head inwardly of the socket and in a portion of the length of the stem, and a covering of insulation, said covering having an end terminal portion thereof snugly fitting said socket and enclosing that portion of the conductor within said socket and said covering further enclosing that portion of the conductor projecting outwardly from said head.

3. In combination, a conductor adapted to lead to an indicating element, an electrode adapted to extend into a battery and consisting of a stem and a head, said head provided with a socket spaced from said stem, said conductor extending through said socket and further embedded in the head inwardly of the socket whereby the conductor will be electrically connected with the stem, and a covering of insulation, said covering having an end terminal portion thereof fitting said socket and enclosing that portion of the conductor within said socket and further enclosing that portion of the conductor projecting outwardly from said head.

In testimony whereof, I affix my signature hereto.

WETZEL GOFF.